Figure 1:
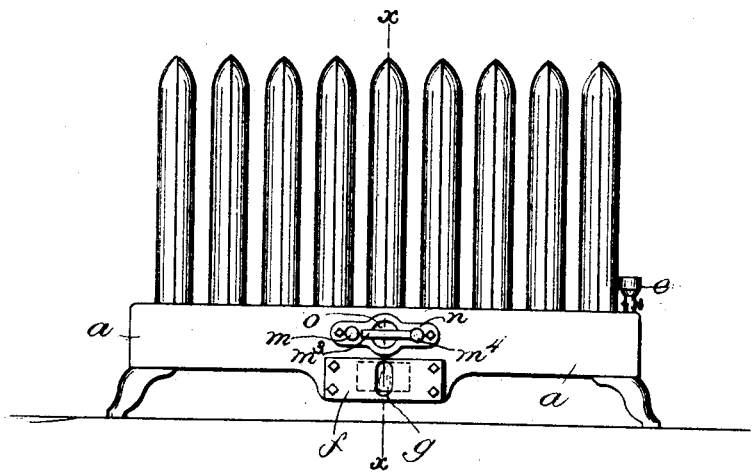

(No Model.)

I. FISHER & J. W. PARTRIDGE.
STEAM GENERATOR AND HEATING APPARATUS.

No. 516,088. Patented Mar. 6, 1894.

Witnesses
Jas. J. Maloney.
M. E. Hill

Inventors,
Israel Fisher
and John W. Partridge,
by Jos. P. Livermore
Att'y.

UNITED STATES PATENT OFFICE.

ISRAEL FISHER, OF MEDFORD, AND JOHN W. PARTRIDGE, OF CAMBRIDGE, MASSACHUSETTS.

STEAM-GENERATOR AND HEATING APPARATUS.

SPECIFICATION forming part of Letters Patent No. 516,088, dated March 6, 1894.

Application filed April 15, 1893. Serial No. 470,419. (No model.)

*To all whom it may concern:*

Be it known that we, ISRAEL FISHER, of Medford, and JOHN W. PARTRIDGE, of Cambridge, county of Middlesex, State of Massachusetts, have invented an Improvement in Steam-Generators and Heating Apparatus, of which the following description, in connection with the accompanying drawings, is a specification, like letters on the drawings representing like parts.

Our invention relates to a steam generator and is shown as embodied in a radiator for heating purposes.

The main object of the invention is to enable a heating apparatus of a kind that is capable of evolving heat rapidly and at high temperature but not in very great volume to be employed effectively for generating steam in a suitable receptacle such for example as a radiator or boiler, to accomplish which result the heater proper acts only upon a small portion of the water in the receptacle at any one time, the said portion being separated from the main portion by a partition, forming an ebullition chamber, which partition prevents the rapid circulation of the water and thus prevents the heat that is applied to the water inside the ebullition chamber from being distributed by convection to the body of water at the outside of said chamber. Thus the comparatively small body of water in the ebullition chamber can be readily brought to the boiling point and converted into steam without necessarily heating the entire body of water in the receptacle to the boiling point, and an effective generation of steam is thus attained with a heater which might not operate efficiently if acting on the entire body of water at once.

When the apparatus is used for warming purposes, as herein shown, the main chamber or receptacle may be in the form of a radiator and may contain a definite amount of water, portions of which are successively converted into steam by the action of the heater, the steam thus generated filling the main portion of the space in the radiator and giving out its heat and condensing therein and flowing back to the bottom of the radiator from which it is admitted slowly to the ebullition chamber to replace the water evaporated therefrom by the heater. This separation of a small portion of the body of water in the ebullition chamber from the main body of water for the purpose of converting the same into steam, may be employed with heaters of various kinds, and as shown in this instance, an electric heater is employed which is shown as composed of a number of conductors of high resistance, preferably rods of carbon or pencils of plumbago or carbon or a suitable composition or mixture containing a considerable percentage of carbon such for example as the material used in ordinary lead pencils. These conductors are connected with a supply circuit by connectors passing through the wall of the radiator and are immersed in the water in the ebullition chamber which is in the form of a small box open at its top and immersed in the body of water in the radiator, and provided with a small opening through which the water can pass from the outside to the inside so as to normally stand at about the same level inside as outside of the ebullition chamber without however, establishing such a circulation as to necessitate the entire body of water outside the ebullition chamber being raised to the boiling point before ebullition takes place.

Figure 2:
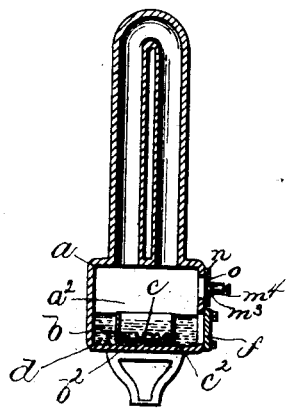
Figure 3:
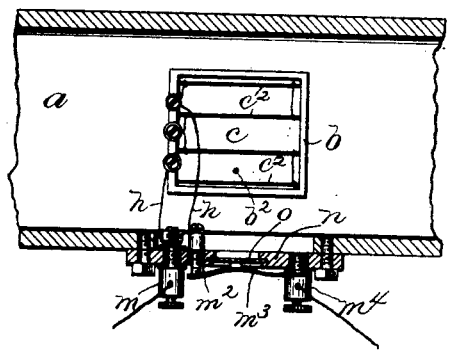

Figure 1 is a side elevation of a heating apparatus embodying this invention; Fig. 2 a transverse vertical section thereof, on line $x, x$, and Fig. 3 a horizontal sectional detail on a larger scale showing the heating chamber in plan.

The apparatus as herein shown comprises a closed chamber or receptacle $a$ in which the steam is to be generated said chamber being shown in this instance as of proper construction to have a large superficial area exposed to the surrounding air, so as to operate as a radiator for warming a building or apartment in which the apparatus is used. The lower portion of said radiator chamber is provided with a depression $a^2$ which constitutes a fount containing sufficient water to maintain a supply for the generation of steam to fill the upper part, from which the water flows back as the steam condenses so that there is only an internal circulation of water and steam.

In order to enable a heater to be used that is not capable of generating heat in a very large volume an ebullition chamber $b$ containing the heater $c$ is placed in the lower part of the radiator $a$ so as to be surrounded by the water $d$ therein and said chamber $b$ which is open at the top is provided with a small opening $b^2$ below the water level so that the water can enter from the outside and will normally stand at about the same level as outside. The chamber $b$ is of such size with relation to the heater $c$ as to contain only a sufficient amount of water to be effectively acted upon by the said heater which can thus quickly raise the temperature of the small amount of water to the boiling point and cause it to be rapidly converted into steam which fills the space in the chamber $a$ above. In proportion as the water is thus evaporated from the chamber $b$ it enters the same from the fount outside thus maintaining a sufficient quantity of water to be effectively acted upon by the heater $c$ without however, requiring that the entire body of water in the fount should be brought to the boiling point before ebullition takes place, as would be the case if the heat were immersed directly in the body of water in the fount $a^2$ so that the heat would be distributed throughout the body by convection, under which conditions the entire mass would have to be heated to the boiling point before there would be any appreciable ebullition.

The radiator $a$ is shown as provided with a filling cup $e$ and with a movable plate or cover $f$ to afford access to the ebullition chamber and heater if required, said cover being shown as containing a transparent opening $g$ through which the height of the water inside can be observed.

The heater $c$ is shown as composed of a number of rods or bars $c^2$ of electric conducting material which may be connected in circuit in the most effective way, and the terminals of which are connected with wires $h$ which pass out through the walls of the radiator $a$ through suitable packing, being shown as connected with binding posts $m, m^2$, contained in, but insulated from, a removable plate $n$ tightly secured over a suitable opening in the chamber $a$. The plate $n$ is shown as provided with a diaphragm $o$ which is expanded or bulged out by the pressure of the steam inside the radiator and may thus be employed to regulate the action of the heater by operating a suitable circuit closer $m^3$ interposed between the internal binding-screw $m^2$ and external binding-screw $m^4$ to open the circuit and thus stop the generation of heat when the steam pressure rises to the desired maximum.

The specific construction of the heater is not herein claimed as of itself it forms no part of the present invention, as any suitable heater adapted to be submerged in the liquid to be heated may be employed.

It is obvious that the invention so far as relates to the ebullition chamber is applicable for the generation of steam for various uses, either for heating as herein illustrated, or for power, or for cooking, it being necessary only to employ the apparatus in a suitable receptacle or boiler adapted for whatever purpose the apparatus is to be used.

It is not essential that the receptacle should be closed, as the herein described ebullition chamber and heater might be employed where it is desired to effect evaporation in an open vessel, for the purpose of concentrating a liquid or for like purposes.

We claim—

1. The combination of the heater for evaporating the liquid with an ebullition chamber immersed in the body of the liquid to be operated upon and communicating therewith whereby the liquid is admitted to the said ebullition chamber, and that portion only of the liquid at any time inside the said chamber is subjected to direct action of the heater, substantially as and for the purpose described.

2. The combination of the main receptacle with an ebullition chamber and heater contained therein, said chamber being immersed in the water in the main receptacle and provided with a small passage through which liquid enters the said ebullition chamber, the heater contained in said ebullition chamber being submerged in the liquid therein, substantially as described.

3. The combination of a radiator adapted to contain water and steam with a steam generator inclosed in said radiator and submerged in the liquid therein, substantially as and for the purpose described.

4. The combination in a steam-heating device, of a steam chamber and a fount for water at the base with an ebullition chamber in the said fount provided with a small hole or opening through which the water enters, and a heater submerged in the water contained in said ebullition chamber, substantially as described.

In testimony whereof we have signed our names to this specification in the presence of two subscribing witnesses.

ISRAEL FISHER.
JOHN W. PARTRIDGE.

Witnesses:
JOS. P. LIVERMORE,
M. E. HILL.